J. MANSIR.
CUT OFF OR VALVE FOR PUMPS.
No. 190,772. Patented May 15, 1877.
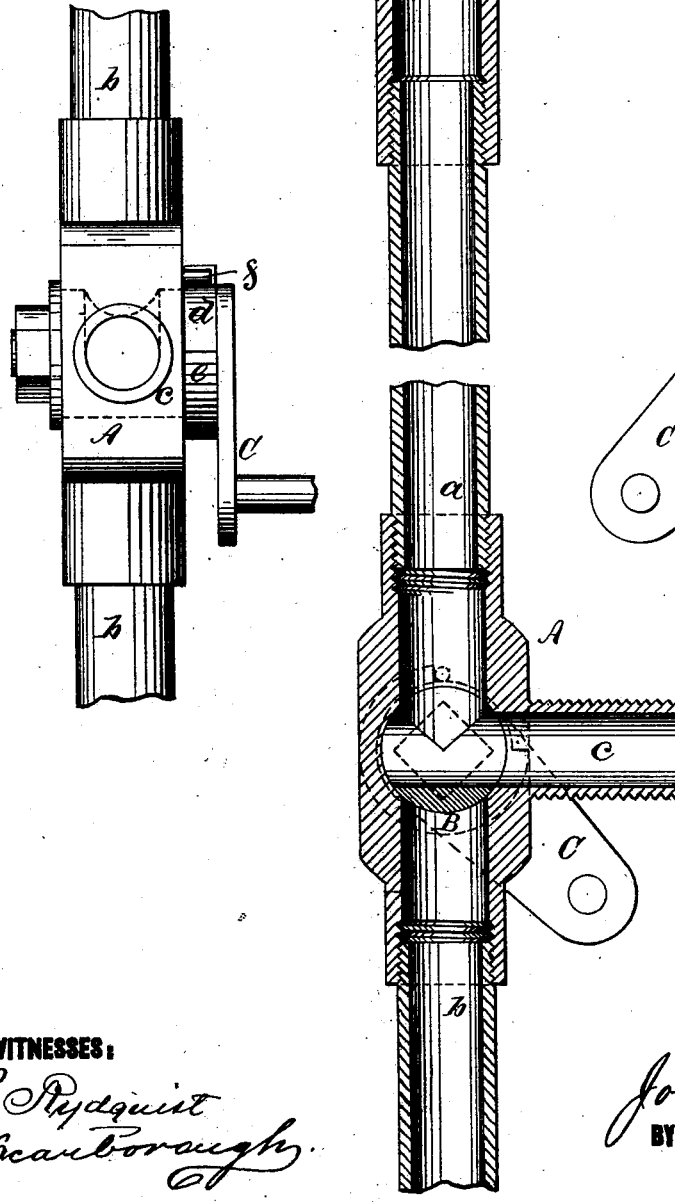
WITNESSES:
H. Rydquist
J. H. Scarborough
INVENTOR:
Job Mansir
BY Munn & Co
ATTORNEYS.

UNITED STATES PATENT OFFICE.

JOB MANSIR, OF RICHMOND, MAINE.

IMPROVEMENT IN CUT-OFFS OR VALVES FOR PUMPS.

Specification forming part of Letters Patent No. 190,772, dated May 15, 1877; application filed February 3, 1877.

*To all whom it may concern:*

Be it known that I, JOB MANSIR, of Richmond, in the county of Sagadahoc and State of Maine, have invented a new and Improved Cut-Off or Valve for Pumps, of which the following is a specification:

Figure 1 is a longitudinal section of my improved cut-off or valve. Fig. 2 is a front view. Fig. 3 is a side view of the same.

Similar letters of reference indicate corresponding parts.

The object of my invention is to provide a cut-off for the suction-pipe of a pump, which is capable of making connection with either of two branch pipes, or both, as may be desired.

The invention is mainly designed for attachment to the pumps of steamers or other vessels, so that they may be used for pumping from either of two places, or from both, as may be required.

In the drawing, A is the body of the valve, which is threaded or flanged at each end to receive pipes $a$ $b$, and is provided with a central nipple, $c$, for attaching a branch pipe.

At the junction of the nipple $c$ and the body A the latter is bored to receive the plug $d$, which is retained in place by a nut and washer, in the usual way, and is cut away at its center, leaving only the segmental portion B, which is of such width as to stop the passage through the body A, or to stop the passage through the nipple $c$.

C is a lever attached to a squared portion of the plug $d$, to which a rod is connected for operating the valve.

$e$ is a flange on the plug $d$, a portion of which is cut away, so that it may serve as a stop, the pin $f$, projecting from the body A, engaging the shoulders at the ends of the recess thus formed.

Supposing the pump to be connected with the pipe $a$, when the plug is turned so as to close the passage to the pipe $b$, the pump draws through the pipe $a$ and the pipe attached to the nipple $c$.

The plug may be turned so as to partly open the passage to the pipe $b$ and partly close the pipe $c$, when the pump will draw through the pipes $a$ and $b$ and nipple $c$. By turning the plug still farther, the nipple $c$ will be closed and the pump will draw through $a$ $b$.

Having thus described my invention, I claim as new and desire to secure by Letters Patent—

A cut-off or valve for pumps, consisting of a body, A, provided with a nipple, $c$, and stop-pin $f$, the plug $d$, having the segmental portion B and flange $e$, substantially as herein shown and described.

JOB MANSIR.

Witnesses:
 EDWARD MANSIR,
 ARTHUR E. CLARKE.